(12) United States Patent
Gouze et al.

(10) Patent No.: US 11,692,960 B2
(45) Date of Patent: Jul. 4, 2023

(54) ELECTROCHEMICAL MEASUREMENT CARTRIDGE (71) Applicant: COMMISSARIAT A L'ENERGIE ATOMIQUE ET AUX ENERGIES ALTERNATIVES, Paris (FR)

(72) Inventors: Eric Gouze, Grenoble (FR); Frederic Bottausci, Grenoble (FR); Pascal Mailley, Grenoble (FR); Olivier Fuchs, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 543 days.

(21) Appl. No.: 16/615,549

(22) PCT Filed: May 24, 2018

(86) PCT No.: PCT/EP2018/063719
§ 371 (c)(1),
(2) Date: Nov. 21, 2019

(87) PCT Pub. No.: WO2018/215617
PCT Pub. Date: Nov. 29, 2018

(65) Prior Publication Data
US 2020/0173950 A1 Jun. 4, 2020

(30) Foreign Application Priority Data
May 26, 2017 (FR) ...................... 1754660

(51) Int. Cl.
*G01N 27/27* (2006.01)
*G01N 1/18* (2006.01)
(Continued)

(52) U.S. Cl.
CPC ............... *G01N 27/27* (2013.01); *G01N 1/18* (2013.01); *G01N 27/07* (2013.01); *G01N 27/283* (2013.01); *G01N 27/301* (2013.01); *G05D 23/24* (2013.01)

(58) Field of Classification Search
CPC ........ G01N 27/27; G01N 27/301; G01N 1/18; G01N 27/07; G01N 27/283; G05D 23/24
See application file for complete search history.

(56) References Cited

U.S. PATENT DOCUMENTS

2009/0277242 A1* 11/2009 Crane ................ G01N 27/3274
73/1.02
2012/0234696 A1* 9/2012 Mosley .............. G01N 27/4167
204/407

(Continued)

FOREIGN PATENT DOCUMENTS

DE 102 33 237 A1 2/2004
WO WO-8504719 A1 * 10/1958
WO WO 85/04719 A1 10/1985

OTHER PUBLICATIONS

Yantasee et al., Automated portable analyzer for lead(II) based on sequential flow injection and nanostructured electrochemical sensors, Talanta, vol. 68, pp. 256-261 (2005) (Year: 2005).*

(Continued)

*Primary Examiner* — Joshua L Allen
*Assistant Examiner* — Vivian A Tran
(74) *Attorney, Agent, or Firm* — Oblon, McClelland, Maier & Neustadt, L.L.P.

(57) ABSTRACT

An electrochemical measurement cartridge includes a container including a first analysis chamber for receiving a fluid to be analyzed and a second calibration chamber for receiving a calibration fluid; an electrochemical measurement sensor including at least one work electrode and one reference electrode; a container supporting the sensor and a cover (Continued)

arranged mobile relative to one another to confer on the cartridge at least two separate operating configurations, a first configuration in which the sensor is communicating with the first analysis chamber and a second configuration in which the sensor is communicating with the second calibration chamber; sealing between the chambers of the container and the cover; and a drive member for providing a relative movement of the container relative to the cover.

16 Claims, 7 Drawing Sheets

(51) Int. Cl.
*G01N 27/07* (2006.01)
*G01N 27/30* (2006.01)
*G05D 23/24* (2006.01)
*G01N 27/28* (2006.01)

(56) References Cited

U.S. PATENT DOCUMENTS

| 2012/0240656 A1 | 9/2012 | Crane et al. |
| 2014/0099646 A1 | 4/2014 | Connolly et al. |
| 2016/0326514 A1 | 11/2016 | Connolly et al. |
| 2017/0292151 A1 | 10/2017 | Connolly et al. |

OTHER PUBLICATIONS

International Search Report dated Aug. 10, 2018 in PCT/EP2018/063719 filed on May 24, 2018, citing documents AA-AE, AO and AP therein, 2 pages.

\* cited by examiner

ELECTROCHEMICAL MEASUREMENT CARTRIDGE

TECHNICAL FIELD OF THE INVENTION

The present invention relates to an electrochemical measurement cartridge carrying a sensor or a set of sensors.

The invention also relates to an electrochemical measurement device that comprises said cartridge and a control and processing assembly designed notably to read the signals generated by the sensor of the cartridge.

PRIOR ART

A conventional electrochemical measurement device makes it possible selectively to measure the concentration of chemical compounds in fluids. It uses a sensor comprising at least one measurement electrode and one reference electrode and, optionally, a counter-electrode and a reader designed to interpret the electrical signals received from the sensor. In the sensor, the electrodes may be arranged in different configurations.

It is known that the measurements generated by sensors of the electrochemical type are liable to drift over time. With a view to limiting such drifts, the sensors have to be calibrated when commissioned and then "recalibrated" regularly as a function of the conditions of use, thereby making it possible to guarantee a degree of consistency in the measurements performed over the course of time.

A calibration phase of an electrochemical sensor is performed by immersing the electrodes thereof in a reference solution of known characteristics. The total calibration phase of the sensor may comprise a plurality of successive immersions of the electrodes in one or more reference solutions, interspersed with phases of cleaning the electrodes of the sensor.

As a general rule, such a calibration phase is performed manually, i.e. an operator is responsible for carrying out the various immersions in each reference solution and for cleaning the electrodes of the sensor between each immersion.

It can easily be understood that this operation may prove to be long and tedious and that it is unsuited to using the sensor in the field.

Document WO2013/090882 A1 proposes a system for calibrating an automated electrochemical sensor in which the reference solution for calibration is regularly supplied to the sensor for calibration thereof. This system, however, proves to be complex to implement, requiring the use of pumps, valves and control electronics.

Document WO85/04719 A1, meanwhile, describes a chemical analysis system using a cartridge. The cartridge comprises a transparent board, a rotating multi-chamber cylinder, sensors, and a measurement chamber present on the board that is in contact with the sensors and into which the fluid originating from one of the chambers of the cylinder is injected for analysis by the sensors.

This solution proves to be very bulky and unsuitable for a portable device. Moreover, it presents the drawback of using a single analysis chamber which receives the fluid originating from a first chamber of the rotary cylinder when the latter is in a first position and the fluid originating from a second chamber of the rotary cylinder when the latter is in a second position. This solution does not make it possible to perform a plurality of successive measurements without consuming excess fluid since it requires the fluid present in the analysis chamber to be evacuated each time prior to each new measurement.

The object of the invention is thus to propose an electrochemical measurement device that makes it possible, notably, to perform a calibration of the sensor that is reliable, simple and offers other particularly advantageous functionalities, notably that of not losing the fluid employed for the calibration measurement. An indirect advantage is that a rinsing fluid may likewise serve as storage solution between two measurements, which isolates the sensor from the analysis medium that is generally likely to foul the sensor. The device of the invention may, notably, have a particularly compact architecture, rendering it easily transportable and usable everywhere.

PRESENTATION OF THE INVENTION

This object is achieved by an electrochemical measurement cartridge that comprises:
- a container comprising a plurality of compartments,
- a cover secured to said container such as to form, in said cartridge, an internal volume defining at least a first chamber designed to receive a first fluid for analysis and a second chamber designed to receive a second fluid,
- sealing means for hermetically insulating the first chamber from the second chamber,
- an electrochemical measurement sensor comprising at least one work electrode and one reference electrode and integral with said cover,
- said container and cover being arranged such as to move relative to one another in order to confer on the cartridge at least two distinct operating configurations, a first configuration in which the sensor is placed in the first chamber to enter into contact with the first fluid present in said first chamber and to perform a first measurement on the first fluid, and a second configuration in which the sensor is placed in the second chamber to enter into contact with said second fluid present in said second chamber and to perform a second measurement on the second fluid,
- driving means interacting with the container and the cover such as to ensure a relative movement between the container and the cover and to confer on the cartridge its first configuration or its second configuration.

According to a particular feature, the container comprises a cylindrical housing in the form of an axisymmetric barrel, and in that said compartments are formed by radial walls around the axis of revolution thereof.

According to a particular embodiment, the cover has the form of a cone carrying said sensor on its flank and arranged stationary relative to said barrel.

According to another particular embodiment, the cover has the form of a disk carrying said sensor and arranged stationary relative to said barrel.

According to another particular feature, said sealing means comprise at least one seal arranged between the housing of the container and the cover of the cartridge.

According to another particular feature, the seal comprises a lattice structure.

According to another particular feature, the sensor comprises a plurality of electrodes and each electrode of the sensor comprises a pad arranged flush with a surface of the cover.

According to another particular feature, the cartridge comprises at least a first filling/emptying opening opening out in said first chamber.

According to a particular embodiment, the first chamber comprises a volume that is enlarged relative to that of the second chamber, and in that said cover comprises a second filling/emptying opening placed such as to open out in said first chamber in said first configuration and to be closed off in said second configuration.

According to another particular feature, the sensor forms part of a sensor assembly, also comprising a thermistor.

The invention also relates to an electrochemical measurement device that comprises:
- an electrochemical measurement cartridge such as defined above,
- mechanical driving means arranged such as to interact mechanically with said electrochemical measurement cartridge such as to ensure a relative movement between the container of the cartridge and the cover of the cartridge,
- a control and processing assembly arranged such as to control said mechanical driving means and said sensor as a function of a determined control sequence.

According to a particular feature, said mechanical driving means and said control and processing assembly are grouped together in a base on which the electrochemical measurement cartridge is assembled.

According to another particular feature, the base comprises an intermediate component on which said cartridge is secured, and the device comprises a cap covering said cartridge and secured to said intermediate component.

According to another particular feature, the device comprises a support member arranged between said cap and said cartridge.

According to another particular feature, the device comprises electrical connection members arranged on the cartridge and on the base and connected to said sensor and to the control and processing assembly.

According to another particular feature, the mechanical driving means comprise at least one electric motor provided with a rotary shaft on which the cartridge is positioned.

BRIEF DESCRIPTION OF THE DRAWINGS

Other features and advantages will become apparent in the following detailed description regarding the appended drawings, in which.

In the remainder of the description, the index number 0.1 is used to refer to the first embodiment of the device and the index number 0.2 is used to refer to the second embodiment of the device.

DETAILED DESCRIPTION OF AT LEAST ONE EMBODIMENT

The invention relates, notably, to a particular electrochemical measurement cartridge $1.1$, $1.2$ designed to be employed in an electrochemical measurement device.

This cartridge permits easy calibration of the device, without manual intervention, when the device is provided with mechanical driving means.

An electrochemical measurement device conventionally comprises at least:
- one sensor provided with at least two electrodes, the operating principle of which is explained below, and
- a reader L connected electrically to the sensor and designed to interpret the signals generated by the sensor.

The sensor employed is of electrochemical type. An electrochemical sensor functions on the principle of the exchange of electrons between one electrode, of a metallic or carbon-based nature, and a liquid medium containing the target molecular species. The reactions observed are either redox reactions (direct reactions at the electrode, dynamic measurements (M) of amperometric or voltammetric types) or capacitive phenomena (potentiometric measurements linked to charge accumulation effects). In the case of the sensors, the target reaction thus takes place respectively either directly at the surface of the electrode or within a polymer-based membrane rendering the sensor selective in terms of the target molecular species.

An electrochemical sensor has a plurality of distinct architectures. It comprises at least two electrodes designed to be immersed in a fluid for analysis. In a non-limiting manner, FIGS. 1A and 1B show two distinct sensor configurations.

Figure 1A:
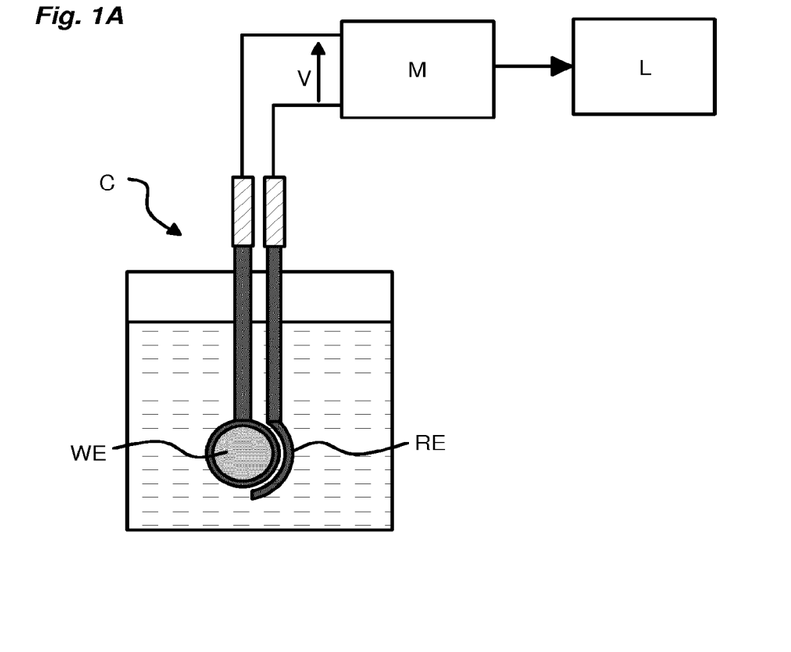
FIGS. 1A and 1B schematically represent the structure of an electrochemical measurement device, respectively in a two-electrode configuration and in a three-electrode configuration.

In a first embodiment, illustrated in FIG. 1A, an electrochemical sensor comprises only two electrodes, a "work" electrode (WE) and a reference electrode (RE), reputed to be insensitive to variations in the medium to be measured. It is then a matter of observing the discrepancy in voltage (V) between the work electrode and the reference electrode. This instance is called a "potentiometric" measurement.

Furthermore, there is, notably, an "all-solid" potentiometric electrochemical sensor based, notably, on the use of a hydrophobic nanostructured electrode on which a selective membrane is deposited. This membrane is, for example, a mixture of an amorphous polymer (PVC, PU, etc.), a selective agent (ionophore) allowing the capture of the target ion by complexation, a plasticizer, aliphatic ionic fillers, and a sacrificial solvent. The solvent fluidifies the mixture to allow deposition thereof on the electrode and then evaporates. The sensor employed in the cartridge 1 of the invention will advantageously be of this "all-solid" type.

Figure 1B:
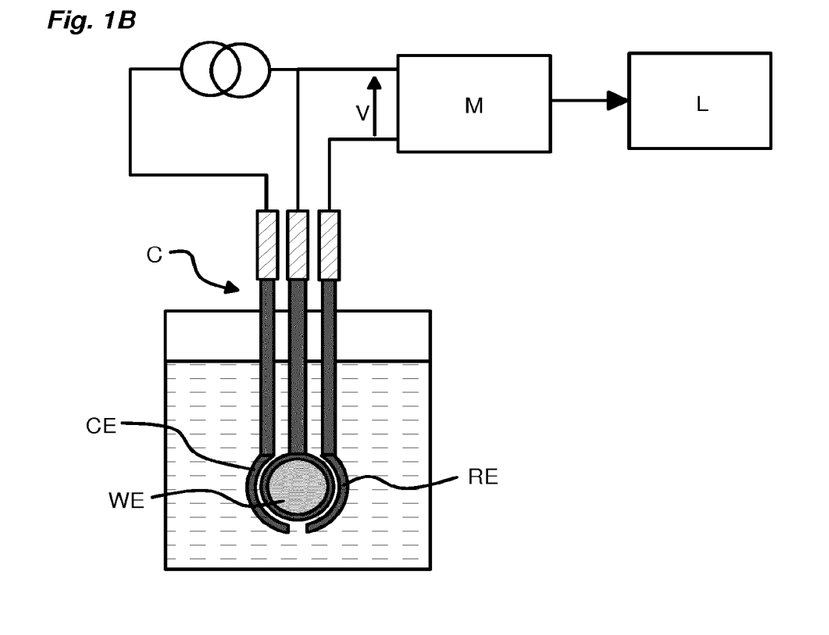

In a second embodiment, illustrated in FIG. 1B, a counter-electrode (CE) is added to push the potential of the work electrode out of equilibrium relative to the reference electrode. The current flowing through the electrochemical circuit between the measurement electrode and the counter-electrode is measured for a given potential. This measurement is carried out either at constant voltage WE-RE ("amperometric" measurement) or by performing a voltage sweep (ramp, crenelations, staircase, etc.) and by characterizing the current peak/plateau obtained ("voltammetric" measurement), either by imposing a variation by current jump between the WE and RE electrodes (chronopotentiometric measurement) or, lastly, by measuring the resultant signal (current or voltage) of a potential-modulated stimulation between the WE and RE electrodes or a current-modulated stimulation between the WE and CE electrodes (measurement called electrochemical impedance spectroscopy if the setpoint is multi-frequency, or conductivity if the setpoint is single-frequency). This measurement may be performed either on a bare electrode or on a modified electrode (for example, an electrode modified by means of a semi-permeable membrane, an enzyme or a catalyst that can be deposited on the surface of the electrode in order to enhance the selectivity of the measurement).

As the invention described below does not relate to the architecture of the electrochemical sensor itself but to the use of a sensor in a measurement device, it must, however, be understood that the sensor may have different possible configurations.

In a non-limiting manner, in the remainder of the description the sensor used in the electrochemical measurement device of the invention will be deemed to have two electrodes, i.e. to include a work electrode and a reference electrode. The sensor may be integrated into a sensor assembly C of the electrochemical measurement device that may also include a thermistor for measuring the temperature of the fluid of the measurement solutions and other sensors.

According to a particular aspect of the invention, the electrochemical measurement device comprises:
- an electrochemical measurement cartridge 1.1, 1.2 that comprises, notably, a sensor assembly C comprising at least said electrochemical measurement sensor;
- a control and processing assembly 20.1, 20.2, this control and processing assembly 20 comprising, for its part, the reader L;
- driving means 21.1, 21.2 designed to interact mechanically with the cartridge 1.1, 1.2 and to be controlled by the control and processing assembly 20.1, 20.2.

In a non-limiting manner, it will be seen that the control and processing assembly 20.1, 20.2 and the driving means 21.1, 21.2 are advantageously grouped together in one and the same base 2.1, 2.2, the cartridge 1.1, 1.2 being designed to be removably secured to this base 2.1, 2.2.

The term "removable" must be understood to mean that the cartridge may be easily assembled together with and detached from the base by only a simple manual movement of one part relative to the other.

The electrochemical measurement cartridge 1.1, 1.2 of the invention more particularly has an architecture formed by a plurality of principal elements:
- a container 10.1, 10.2 comprising a plurality of compartments 100.1, 100.2;
- a cover 11.1, 11.2 supporting the sensor; according to the embodiment, this cover 11.1, 11.2 may have the form, respectively, of a cone or of a disk;
- holding and driving means performing, notably, a function of holding between the container 10.1, 10.2 and the cover 11.1, 11.2 and mechanically interacting with one of these two elements in order to allow the rotation thereof relative to the other.

According to a particular aspect of the invention, the container and the cover are able to move relative to one another. In other words, according to two possible configurations, either the container 10.1, 10.2 is driven in movement relative to the cover 11.1, 11.2, which is fixed, or the cover 11.1, 11.2 is driven in movement relative to the container 10.1, 10.2, which is fixed.

The various compartments 100.1, 100.2 of the container are designed to form a plurality of chambers in the cartridge, for example:
- an "analysis" chamber;
- a "calibration" chamber;
- optionally, but advantageously, at least one "storage and rinsing" chamber;
- optionally, but advantageously, one or more other "calibration" chambers.

On a basis of three chambers, there will thus be:
- an analysis chamber designed to receive the sample for analysis;
- a chamber containing a liquid of known composition serving principally to (re)calibrate the sensor;
- a storage/rinsing chamber containing a liquid of known composition serving principally to store or to rinse the sensors; this liquid is thus akin to "pure" water.

Irrespective of the chamber facing the sensor assembly C, the device makes it possible to perform a measurement, including in the storage/rinsing chamber, to complete monitoring of the aging of the cartridge and the sensor assembly.

According to a particular aspect of the invention, the container 10.1, 10.2 of the cartridge, which comprises the various compartments 100.1, 100.2, is secured to the cover that carries the sensor assembly C, such as to cover a surface 117.1, 117.2 of said cover and to enclose said sensor in a single chamber at any one time (during a measurement and thus outside of the periods of relative movement of the container vis-à-vis the cover).

The sensor assembly C is arranged such as to be placed in contact with a single fluid (contained in one of the chambers).

The analysis chamber is designed to receive the fluid for analysis. The fluid may be in the form of a liquid, a gas, a gel, etc.

Each calibration chamber is designed to receive a reference solution at a known concentration in terms of certain chemical compounds.

The storage/rinsing chamber will be required to contain a solution that is neutral with respect to the sensor.

"Chamber" is understood to mean a closed volume inside which a fluid may be held without the fluid being able to escape to the exterior. It will, however, be seen that for operating requirements the cartridge may comprise openings opening out in certain chambers in order to fill/empty the chamber in question.

The electrochemical measurement cartridge 1.1, 1.2 also comprises sealing means. These sealing means comprise at least one seal 12.1, 12.2 in a form adapted for arrangement between the two elements 10.1, 10.2, 11.1, 11.2 mentioned above and at the same time to ensure the sealing of the assembly of the container on the cover and hermetic isolation between the various chambers. It will also be understood that the seal will be required to carry out mechanical cleaning of the "windshield-wiper" type on the surface of the sensor C upon passage of the sensor from one chamber to another. According to a particular aspect of the invention, each chamber is thus isolated hermetically from the other chambers, preventing a movement of fluid from one chamber to another. Each fluid present in a chamber thus remains in its chamber during a measurement (and also upon relative movement of the container with respect to the cover).

According to a particular and non-limiting embodiment, a component made from an absorbent material may also be placed in one of the chambers such as to "mop up" residual liquid present on the sensor assembly C.

The electrochemical measurement device also comprises driving means 21.1, 21.2 designed to interact with the cartridge 1 in order to drive the container 10.1, 10.2 in movement relative to the cover 11.1, 11.2. This may be a clipping device that makes it possible to secure the container and the cover and to provide the mechanical link with the shaft of the motor in order to generate rotation (in practice, a simple flat is usually sufficient).

By virtue of the solution of the invention, it will thus be possible to move the compartments relative to the sensor assembly C such that the latter is directly in one chamber or another of the cartridge, thereby making it possible to perform measurements by coming into contact with the fluid present in the chamber without movement of fluid between the chambers.

The cartridge may also comprise at least one opening opening out into the analysis chamber for the purpose of filling and emptying this analysis chamber. This opening is judiciously placed as a function of the configuration of the cartridge.

The cartridge may also comprise at least one opening opening out into the analysis chamber in order to allow the evacuation of air upon filling of said chamber and possibly also serving as an orifice for manual filling of the chamber using a pipette.

As described above, an electrochemical measurement device also comprises a control and processing assembly 20.1, 20.2.

In a non-limiting manner, the base 2.1, 2.2 advantageously comprises the control and processing assembly 20.1, 20.2 and the driving means 21.1, 21.2 in movement of one of the two elements of the cartridge relative to the other element.

The control and processing assembly may advantageously comprise at least one electronics board. The electronics board is, notably, provided with the following functions:
  receiving measurement signals from the sensor;
  converting the signals received into digital data (analog/digital converter);
  processing digital data;
  managing different operating sequences, including at least one measurement/analysis sequence, one or more calibration sequences, or a storage sequence;
  controlling the driving means of the cartridge in accordance with an operating sequence;
  displaying and/or transmitting data obtained after an operating sequence of measurement/analysis-sequence type;
  placing in standby mode.

The cartridge 1.1, 1.2 and the base 2.1, 2.2 may comprise mechanical and electrical connection members for respectively ensuring the mechanical assembly of the cartridge together with the base and the electrical connection, notably between the sensor assembly C present in the cartridge 1.1, 1.2 and the control and processing assembly present in the base 2.1, 2.2.

Figure 2:
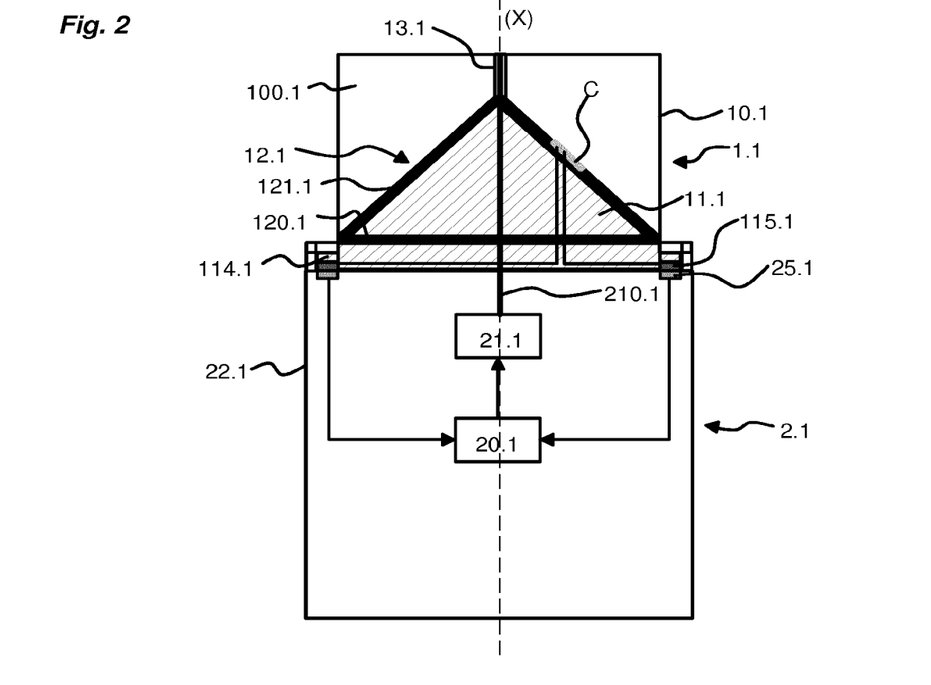
FIG. 2 schematically shows the electrochemical measurement device according to a first embodiment of the invention.
Figure 3:
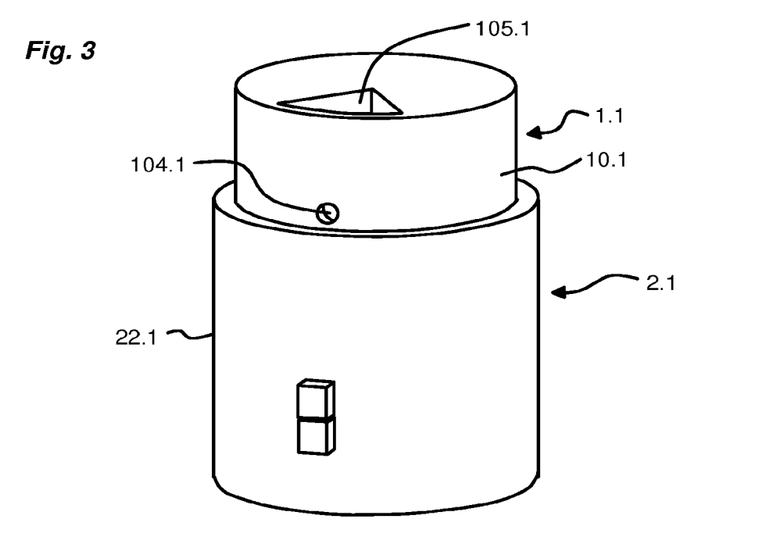
FIG. 3 shows, seen in perspective, the electrochemical measurement device of FIG. 2.
Figure 4:
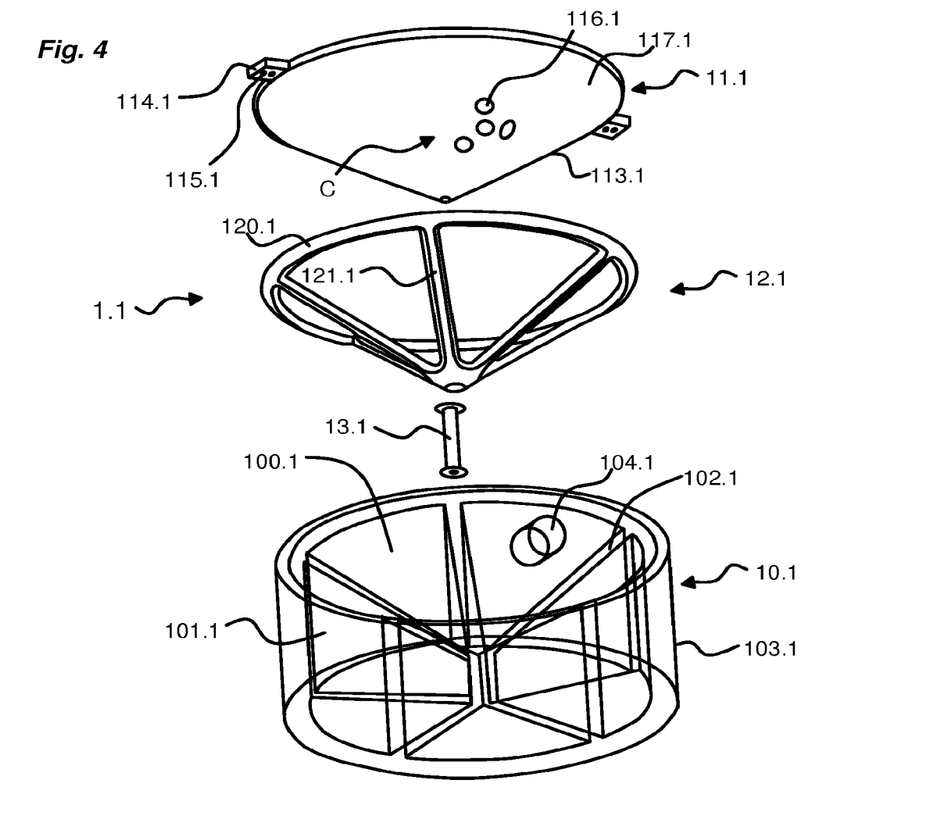
FIG. 4 shows, seen in expanded view and transparently, the electrochemical measurement cartridge according to the first embodiment of the invention.

A first particular embodiment of an electrochemical measurement device according to the invention is shown in FIGS. 2 to 4.

More precisely, with reference to FIG. 4, the electrochemical measurement cartridge 1.1 has, for example, the form of a container having the general form of a cylinder of revolution.

In this first embodiment, the container 10.1 comprises a cylindrical housing 103.1 having a base wall in the form of a disk, a lateral wall, and an opening opposite its base wall. It comprises an internal surface inside its volume and an external surface outside its volume.

Its internal volume is separated into a plurality of compartments 100.1 distributed about its axis (X). Each compartment 100.1 is thus defined by an angular portion of the cylinder. Each compartment 100.1 is defined between two internal radial walls 101.1, each radial wall 101.1 extending from the axis of the cylinder toward the internal surface of the lateral wall. Each radial wall 101.1 comprises a free upper edge 102.1 that follows a downward gradient from the exterior toward the axis of the cylinder, said gradient being, for example, between 30° and 80° relative to the generatrix of the cylinder.

In a non-limiting manner, the container 10.1 may comprise five compartments 100.1 of identical volumes.

The housing 103.1 advantageously comprises a first opening 105.1 through its base wall, at the level of the analysis chamber, and a second opening 104.1 made through its lateral wall and opening out into the analysis chamber. It will be seen that the two openings 104.1, 105.1 opening out into the analysis chamber may be employed. If necessary, they may be closed off by a plug of suitable form.

The cover also comprises a housing 113.1 having the form of a cone, forming a plug matching the opening of the housing of the container in order, by virtue of the seal 12.1, to close its opening hermetically. This conical form notably facilitates the evacuation of air when the analysis chamber is being filled and facilitates the emptying of this chamber.

The inclination of the flank of the cone follows an inclined gradient identical to that of the upper edges of the radial walls of the first part.

The sealing means advantageously comprise a single seal 12.1 of suitable form, for example of lattice form. It has an annular portion 120.1 with a diameter equivalent to the circumference of the opening of the housing 103.1 of the container 10.1 of the cartridge and a plurality of rectilinear radial portions 121.1 extending between an axial common point as far as its annular portion. The radial portions 121.1 are each inclined at a gradient identical to that of the upper edges 102.1 of the radial walls 101.1 defining the compartments 100.1.

The seal 12.1 is designed to be positioned between the housing 103.1 of the container 10.1 of the cartridge and the housing 113.1 of the cover 11.1 of the cartridge 1.1, such that:
  its annular portion is housed in a groove or bears on a shoulder made on the edge of the opening of the housing of the container 10;
  its radial portions follow the inclined gradient of each upper edge of the internal radial walls of the container 10.1 of the cartridge and that of the cone formed by the housing 113.1 of the cover 11.1.

When the cover 11.1 is assembled onto the container 10.1 of the cartridge 1.1, the cone is positioned such that its flank bears against the seal so as to match the internal cavity formed by the compartments of the housing of the container.

In a non-limiting manner, when the two elements 10.1, 11.1 of the cartridge 1.1 are assembled one upon the other, separated by the seal 12.1, the electrochemical measurement cartridge 1.1 comprises five chambers, i.e. an analysis chamber, three calibration chambers, and a storage chamber.

The housing 113.1 of the cover 11.1 is arranged such as to carry the sensor assembly C. As may be understood on the basis of the configuration of the cartridge, the sensor and its electrodes are inclined relative to a plane forming the surface of the liquid in the analysis chamber when the device is positioned in accordance with its axis (X), thereby making it possible to place the sensor in communication with the fluid in each chamber of the cartridge 1.1.

The housing 113.1 of the cover advantageously comprises mechanical securing members 114.1 arranged such as to interact with corresponding mechanical members present on the base 2.1. One or more of these mechanical securing members advantageously comprise one or more electrical connection members 115.1 also designed to be connected to connection members 25.1 present on the base 2.1, in order to provide an electrical connection between the cartridge 1.1 and the base 2.1 and to allow an electrical link between the sensor assembly C and the control and processing assembly 20.1.

The sensor assembly C comprises the electrodes of the electrochemical sensor (reference electrode RE and work electrode WE) arranged, for example, in the form of pads 116.1, each having a surface flush with the flank of the cone. As described above, another pad may be arranged to capture the temperature of the fluid.

In this embodiment, the cartridge 1.1 may also comprise a rotation shaft 13.1 along the axis of the barrel, enabling the barrel to be driven in rotation. This rotation shaft is designed to be mounted on the shaft of an electric motor forming said driving means 21.1 and controlled by the control and processing assembly 20.1 described above. Furthermore, the shaft 13.1 also assembles the container 10.1 and the cover 11.1 together, compressing the seal between the two elements such as to obtain sealing between the chambers even during the movement of the barrel relative to the sensor C.

The sensor assembly C is designed to be connected to the reader of the device such as to transmit signals representative of the measurements made and/or to inject, from the reader to the sensor, the setpoint signals necessary for measurement, for example by means of the electrical connection members 115.1 described above.

With reference to FIGS. 2 and 3, the base 2.1 advantageously has the form of a cylindrical housing 22.1 to which said electrochemical measurement cartridge 1.1 is mechanically and electrically connected.

This housing 22.1 houses an electric motor provided with an output shaft 210.1 on which the axis of the barrel is positioned in order to be driven in rotation. This motor will advantageously be a stepping motor or a DC motor provided with an angular position encoder integral with the rotation shaft, enabling the barrel of the cartridge 1.1 to adopt a plurality of distinct positions relative to the sensor C. Interaction between the barrel and the control shaft must make it possible sufficiently to compress the seal 12.1 positioned between the two elements 10.1, 11.1 of the cartridge 1.1 to preserve the seal between the chambers during the rotation of the barrel relative to the sensor, while not impeding the rotation of the barrel against the surface of the seal 12.1.

This housing 22.1 also houses the control and processing assembly 20.1, which has, for example, the form of one or more electronics boards responsible for executing the functions defined above, notably that of reader for receiving the electrical signals from the sensor C and the interpretation thereof.

A second embodiment of an electrochemical measurement device according to the invention is shown in FIGS. 5 to 9.

As compared to the first embodiment described above, this second embodiment presents the following structural particular features (on the appended figures, the references are indicated with the index number 0.2), the operating principle thereof being globally identical to that of the first embodiment:

The cover 11.2 of the cartridge 1.2 has the form of a component in the form of a disk (113.2—FIG. 7) having a central hole 110.2. Its surface 117.2 comprises a location 118.2 adapted for the sensor assembly C. This location has the form of a cavity into which is inserted the sensor assembly C having the form of a board cut to the dimensions of said cavity. Once the sensor assembly C is in place, the internal surface of the disk (i.e. the surface located inside the cartridge) is perfectly planar.

Figure 7:
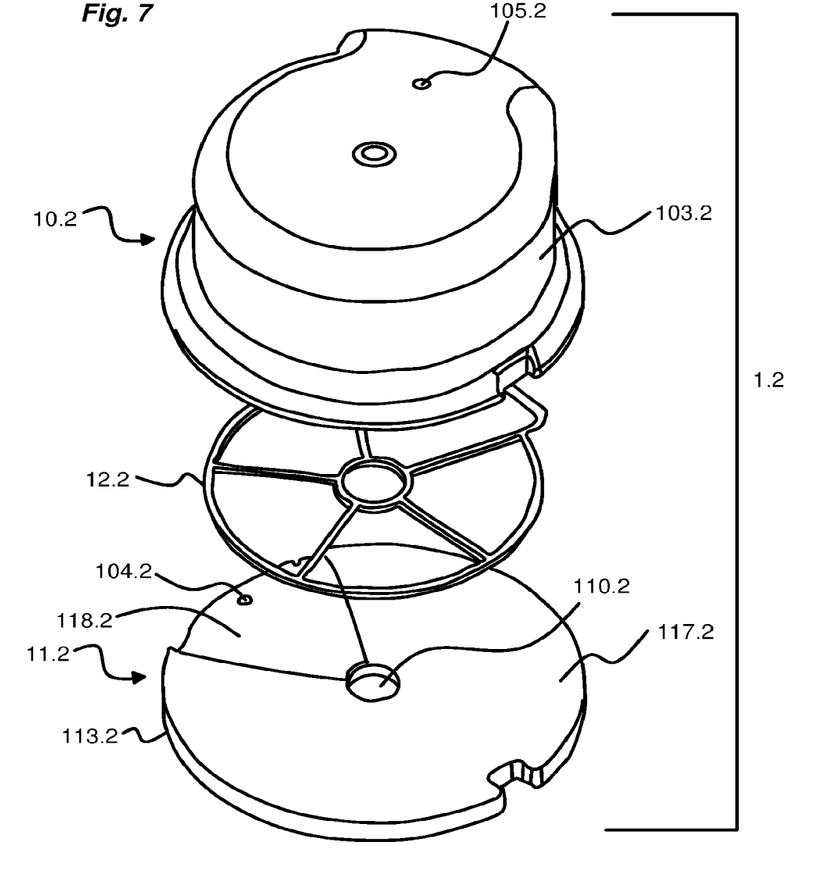
FIG. 7 shows, seen in expanded view, the electrochemical measurement cartridge according to the second embodiment of the invention.

The container forming the cartridge 1.2 at least partially covers said surface 117.2 such as to place said sensor C inside at least one chamber of the cartridge.

Figure 8A:
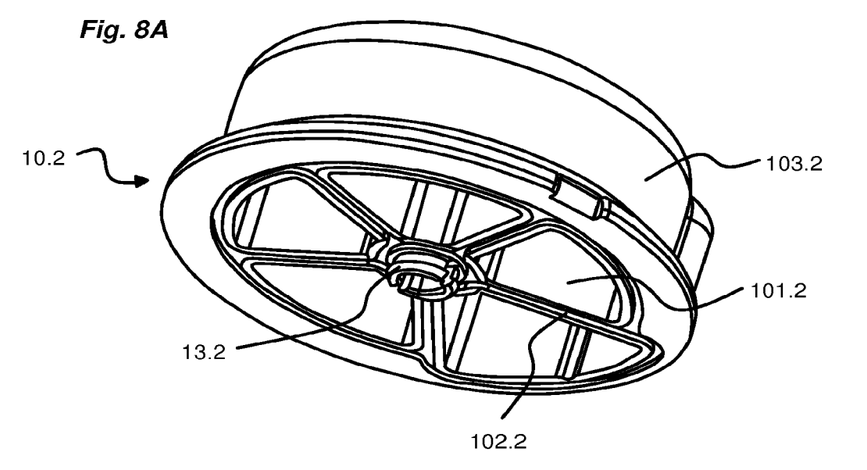
FIGS. 8A and 8B show, seen in perspective and seen from above, the container of the electrochemical measurement cartridge according to the second embodiment of the invention.
Figure 8B:
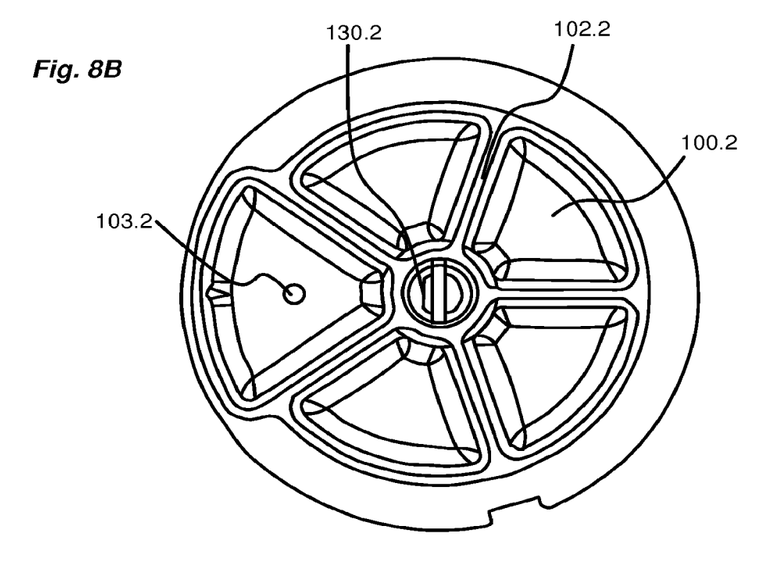

The radial walls 101.2 forming the compartments of the container of the container 10.2 have coplanar edges 102.2 (FIG. 8A).

The seal 12.2 has a planar lattice structure and is housed in grooves that follow the edges of the housing of the container 10.2 and the cover 11.2 is secured to the container 10.2 such as to compress said seal 12.2, guaranteeing a seal between the chambers and a seal relative to the exterior. The sensor assembly C is enclosed in a chamber of the container formed by the assembly of the two elements.

The housing 103.2 of the container comprises an axial internal member 13.2 (FIG. 8A) that has a free end housed in the central hole of the disk of the cover 11.2, securing the two elements together, for example by means of snap-fitting, the cover 11.2 then forming a cover covering the compartments 100.2 of the container in order to produce the chambers of the cartridge.

The axial internal member 13.2 comprises an axial passage provided with a flat 130.2 (FIG. 8B) in which the shaft 210.2 of the motor may be engaged, with a view to ensuring the rotation of the container 10.2 relative to the cover 11.2 of the cartridge.

The second opening 104.2 is made through the cover 11.2.

Figure 9A:
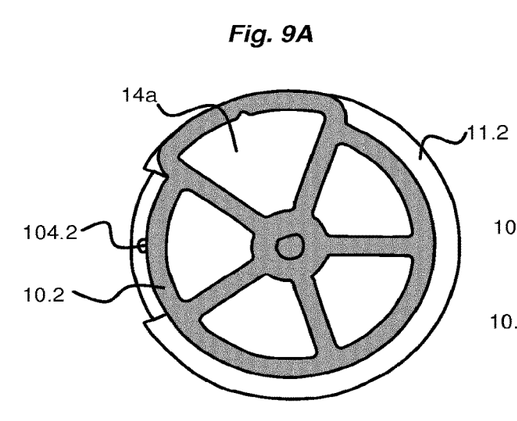
FIGS. 9A and 9B illustrate an operating principle of the cartridge in the second embodiment of the invention.
Figure 9B:
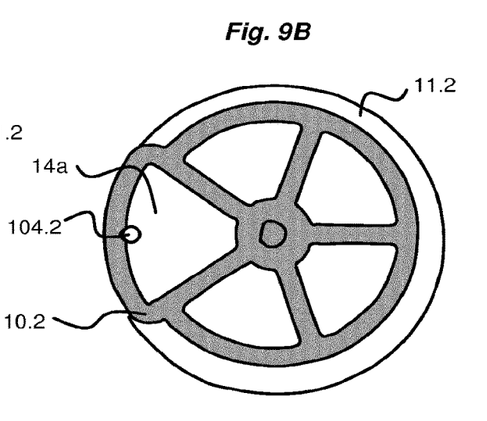

The housing 103.2 of the container 10.2 is produced such as to form a chamber (in this case, the analysis chamber 14a), which has an internal volume distinct from that of the other chambers so as to place the second opening 104.2 in communication with this measurement chamber in a single position of the barrel (FIGS. 9A and 9B). The lateral portion of the housing present at the level of the analysis chamber 14a is in effect offset outward relative to the rest of the lateral wall of the housing, which makes it possible to form an enlarged analysis chamber as compared to the other chambers. The second opening 104.2 is thus positioned such as to communicate with the enlarged part of the measurement chamber 14a in one position of the barrel (FIG. 9B) and such as not to communicate with the internal volume of the other chambers in the other positions of the barrel (FIG. 9A).

Figure 5:
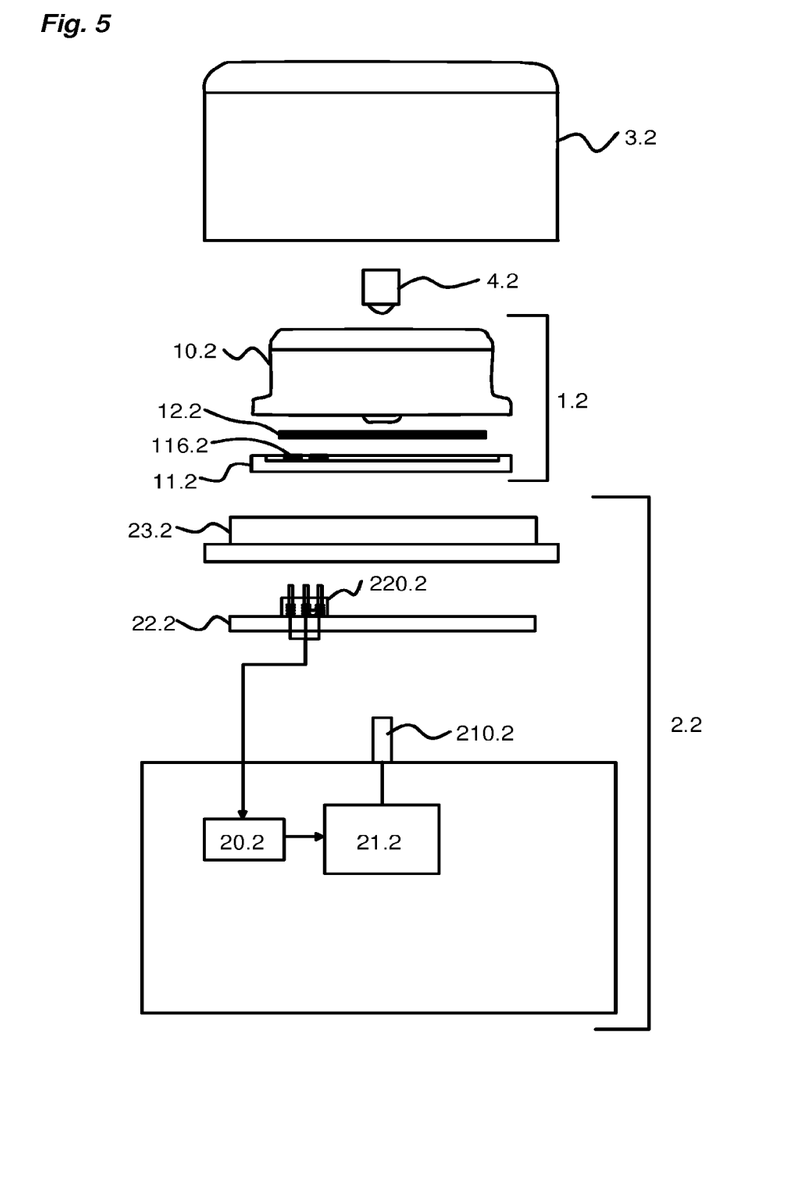
FIG. 5 schematically shows, in expanded view, the electrochemical measurement device according to a second embodiment of the invention.
Figure 6:
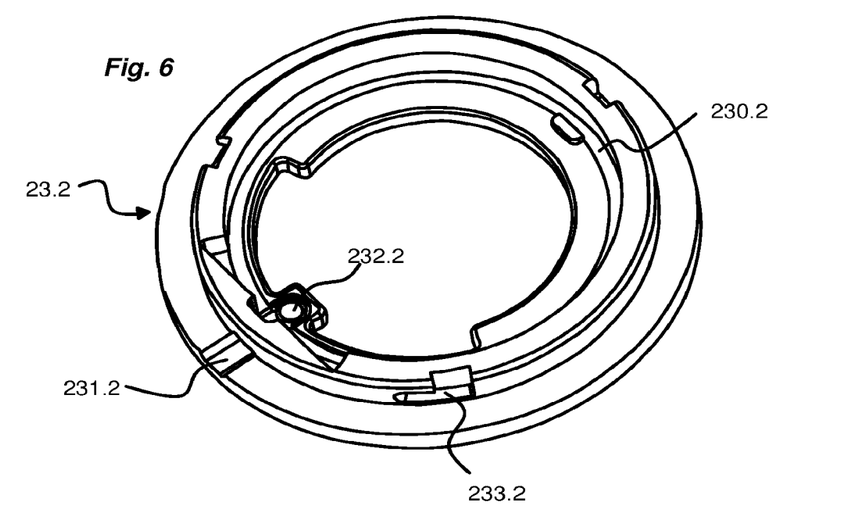
FIG. 6 shows, seen in perspective, the intermediate component employed in the electrochemical measurement device according to the second embodiment of the invention.

The contact pads 116.2 of the sensor C are connected to a printed circuit board 22.2 secured to said intermediate component 23.2 (FIG. 5). The cover 11.2 comprises openings allowing connection points to be made available to said pads.

The printed circuit board 22.2 comprises a plurality of contacts 220.2 (FIG. 5), for example fixed on the board 22.2 and arranged such as to traverse the cover 11.2 over the thickness thereof in order each to bear against an electrical connection point of the sensor C. The contacts may be of the sprung type, as shown in FIG. 5. Other solutions could be envisaged.

The base 2.2 may comprise an intermediate component (FIG. 6) assisting in securing the cartridge to the base and contributing to sealing of the device. This intermediate component thus makes it possible to support the cartridge. It may comprise an orifice 232.2 for filling/emptying the cartridge, located opposite the second opening 104.2 of the cartridge when the latter is secured on said intermediate component, in accordance with the operating conditions mentioned above. It may comprise a sealing channel 230.2 that makes it possible to collect the fluid overflowing from the cartridge and an evacuation channel 231.2 in the form of a drain connected to said sealing channel and designed to evacuate the fluid in the event of overflow. The sealing channel and this drain advantageously have an inclined plane such as to facilitate the evacuation of liquid outside of the cartridge.

A cap 3.2 is arranged such as to completely cover the cartridge 1.2 when the latter is positioned on the intermediate component 23.2 of the base.

The cap 3.2 interacts mechanically with the intermediate component 23.2 via a securing mechanism comprising a tongue provided on the periphery of the cap 3.2 and a notch 233.2 made on the intermediate component 23.2 of the base.

A support member 4.2 may be arranged between the cap 3.2 and the cartridge 1.2 in order to hold the cartridge 1.2 against the intermediate component 23.2, guaranteeing the seal between the two elements of the cartridge 1.2 and the electrical connection between the sensor assembly C and the electronics board 22.2 via the contacts 220.2 provided. This support member may be in the form of a ball plunger positioned between the cap 3.2 and the cartridge 1.2, in the axis of the cartridge, in order to urge the cartridge against the base 2.2 only in the axial direction.

Figure 10A:
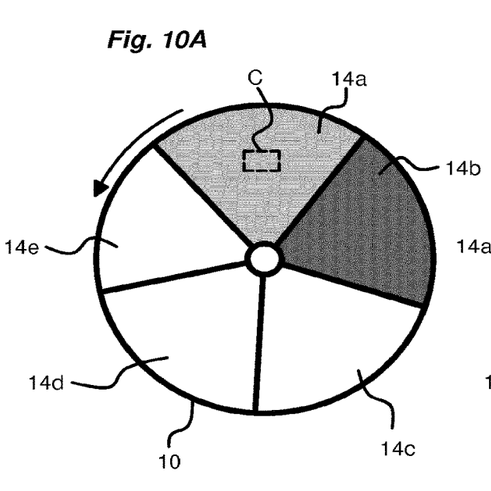
FIGS. 10A and 10B illustrate the operating principle of an electrochemical measurement device according to the invention.
Figure 10B:
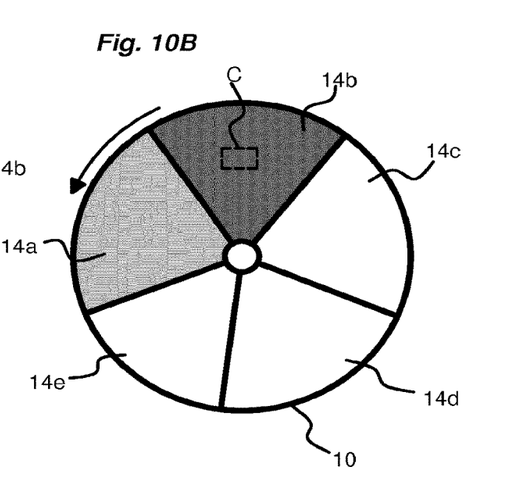

FIGS. 10A and 10B illustrate the operating principle of the electrochemical measurement device of the invention. General operation is identical for the two embodiments described above.

In FIG. 10A, the barrel is controlled in a first position, the sensor assembly C is thus placed in communication with the fluid present in a first chamber 14a of the cartridge 1, for example the analysis chamber. The cartridge 1 is thus in a first operating configuration.

Next, the control and processing assembly 20.1, 20.2 sends a command to the driving means 21.1, 21.2 to turn the barrel relative to the sensor C. The electric motor turns the barrel (about the axis (X)) as far as a second position relative to the sensor C. In FIG. 10B, it may thus be seen that the barrel, in its second position, allows the sensor C to be placed in communication with the fluid present in a second chamber 14b of the cartridge 1, for example a calibration chamber. The cartridge 1 is thus in a second operating configuration. In FIGS. 10A and 10B, the sensor assembly C may also be placed in communication with the internal volume of each of the three other chambers 14c, 14d, 14e after a suitable control of the means 21 for driving the barrel in rotation.

In each of the two configurations of the cartridge 1 shown in FIGS. 10A and 10B, the control and processing assembly 20.1, 20.2 is able to control the sensor assembly C such as to receive measurement signals. In the event of calibration, the control and processing assembly 20.1, 20.2 is then required to correct drifts in the measurements.

Upon rotation of the barrel relative to the sensor C, the seal 12.1, 12.2 integral with the barrel makes it possible to clean the surface of the sensor by means of friction.

In a non-limiting manner, the electrochemical measurement device as described above may be used in different modes:

the cartridge is immersed in the solution to be analyzed or connected to a pump. The analysis chamber is opened toward the exterior and also downward (opening 104.1, 104.2) to allow filling thereof (for example, with the aid of a pump connected to the opening via the intermediate component 23.2 in the second embodiment) and upward (opening 105.1, 105.2) to allow the evacuation of air. To prevent air bubbles remaining trapped in the analysis chamber and screening all or part of the sensor.

Cartridge up: the typical use scenario is in the laboratory, where the operator will fill the analysis chamber with a sample taken using a pipet, via the opening 105.1, 105.2, the opening 104.1, 104.2 then being closed off.

In a non-limiting manner, an operating sequence of the measurement device is, for example, the following:

The cartridge is mechanically and electrically connected to the base and then the analysis chamber is filled with a fluid to be analyzed. The sensor is positioned in the storage chamber (when it is manufactured, and it is highly advisable to return it to the storage chamber after the measurement of the fluid to be analyzed has been made).

At start-up, auto-calibration is launched.

a) The sensor assembly C is positioned in a first, calibration chamber 14b;

The reader performs a measurement (for example, every 5 or 10 seconds) until the measured value has stabilized; the residence time in the first chamber will be longer because it is necessary, first, for the sensor to be rehydrated. Typical residence time: 2 min;

b) the sensor is positioned in a second, calibration chamber 14c; the reader performs a measurement (for example, every 5 or 10 seconds) until the measured value has stabilized; typical residence time: 1 min;

c) the sensor is positioned in a third, calibration chamber 14d; the reader performs a measurement (for example, every 5 or 10 seconds) until the measured value has stabilized; typical residence time: 1 min. The reader may perform calculations of calibration coefficients (offset and gradient);

The sensor assembly is positioned in the storage and rinsing chamber (here, it is rinsing that is important);

d) the sensor is positioned in the analysis chamber 14a;

The reader performs a measurement (for example, every 5 or 10 seconds) until the measured value has stabilized; typical residence time: 1 min;

e) when the measurement frequency is low (for example, every hour), it is preferable to reposition the sensor assembly C in the storage chamber 14e between two measurements;

f) depending on the measurement precision required, it is useful to re-calibrate typically every hour or once per day. The calibration frequency may be adjusted by software as a function of the intrinsic drift characteristics of the sensors.

The electrochemical measurement device described above thus has a number of advantages, including:
- simple, compact architecture;
- the possibility of calibrating the sensor, with no manual intervention, by virtue of the relative movement of the two elements of the cartridge;
- versatile use of the device, for sampling and analyses on site or in the laboratory;
- sealed architecture, enabling it to be used in all environments.

The invention claimed is:

1. An electrochemical measurement cartridge comprising:
a container comprising a plurality of compartments including a first compartment and a second compartment;
a cover secured to said container to form, in said electrochemical measurement cartridge, an internal volume defining at least a first chamber within the first compartment configured to receive a first amount of a first fluid for analysis and a second chamber within the second compartment configured to receive a second amount of a second fluid;
sealing means for hermetically insulating the first chamber from the second chamber;
an electrochemical measurement sensor comprising at least one work electrode and one reference electrode and integral with said cover;
said container and said cover being configured to move relative to one another in order to confer on the electrochemical measurement cartridge at least two distinct operating configurations, including a first configuration in which the electrochemical measurement sensor is placed in the first chamber to enter into contact with the first fluid present in said first chamber and to perform a first measurement on the first fluid, and a second configuration in which the electrochemical measurement sensor is placed in the second chamber to enter into contact with said second fluid present in said second chamber and to perform a second measurement on the second fluid, the first chamber is isolated hermetically from the second chamber such that the first amount of the first fluid remains in the first chamber within the first compartment and the second amount of the second fluid remains in the second chamber within the second compartment when the electrochemical measurement cartridge is in the first configuration and the second configuration and when the electrochemical measurement cartridge moves from the first configuration to the second configuration.

2. The electrochemical measurement cartridge as claimed in claim 1, wherein the container comprises a cylindrical housing in the form of an axisymmetric barrel, and said plurality of compartments are formed by radial walls around an axis of revolution of the container.

3. The electrochemical measurement cartridge as claimed in claim 2, wherein the cover has the form of a cone carrying said electrochemical measurement sensor on a flank and arranged stationary relative to said axisymmetric barrel.

4. The electrochemical measurement cartridge as claimed in claim 3, wherein said sealing means comprises at least one seal arranged between the cylindrical housing of the container and the cover of the electrochemical measurement cartridge.

5. The electrochemical measurement cartridge as claimed in claim 4, wherein the at least one seal comprises a lattice structure.

6. The electrochemical measurement cartridge as claimed in claim 2, wherein the cover has the form of a disk carrying said electrochemical measurement sensor and arranged stationary relative to said axisymmetric barrel.

7. The electrochemical measurement cartridge as claimed in claim 1, wherein each electrode of the electrochemical measurement sensor comprises a pad arranged flush with a surface of the cover.

8. The electrochemical measurement cartridge as claimed in claim 1, further comprising at least a first filling/emptying opening that opens out in said first chamber.

9. The electrochemical measurement cartridge as claimed in claim 1, wherein the first chamber comprises a volume that is enlarged relative to that of the second chamber, and said cover comprises a second filling/emptying opening placed to open out in said first chamber in said first configuration and to be closed off in said second configuration.

10. The electrochemical measurement cartridge as claimed in claim 1, wherein the electrochemical measurement sensor forms part of a sensor assembly, also comprising a thermistor.

11. An electrochemical measurement device comprising:
the electrochemical measurement cartridge as claimed in claim 1;
mechanical driving means configured to interact mechanically with said electrochemical measurement cartridge to ensure a relative movement between the container of the electrochemical measurement cartridge and the cover of the electrochemical measurement cartridge; and
a control and processing assembly configured to control said mechanical driving means and said electrochemical measurement sensor as a function of a determined control sequence.

12. The electrochemical measurement device as claimed in claim 11, wherein said mechanical driving means and said control and processing assembly are grouped together in a base on which the electrochemical measurement cartridge is assembled.

13. The electrochemical measurement device as claimed in claim 12, wherein the base comprises an intermediate component on which said electrochemical measurement cartridge is secured, and comprising a cap covering said electrochemical measurement cartridge and secured to said intermediate component.

14. The electrochemical measurement device as claimed in claim 13, further comprising a support member arranged between said cap and said electrochemical measurement cartridge.

15. The electrochemical measurement device as claimed in claim 12, further comprising electrical connection members arranged on the electrochemical measurement cartridge and on the base and connected to said electrochemical measurement sensor and to the control and processing assembly.

16. The electrochemical measurement device as claimed in claim 11, wherein the mechanical driving means comprises at least one electric motor provided with a rotary shaft on which the electrochemical measurement cartridge is positioned.

* * * * *